United States Patent
Katoh et al.

(10) Patent No.: US 7,903,214 B2
(45) Date of Patent: Mar. 8, 2011

(54) LIQUID CRYSTAL DISPLAY DEVICE COMPRISING AN OPTICAL SENSOR FOR DETECTING THE INTENSITY OF AMBIENT LIGHT

(75) Inventors: Hiromi Katoh, Nara (JP); Yoshihiro Izumi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 11/912,767

(22) PCT Filed: Apr. 18, 2006

(86) PCT No.: PCT/JP2006/308155
§ 371 (c)(1),
(2), (4) Date: Oct. 26, 2007

(87) PCT Pub. No.: WO2006/118028
PCT Pub. Date: Nov. 9, 2006

(65) Prior Publication Data
US 2009/0073345 A1    Mar. 19, 2009

(30) Foreign Application Priority Data
Apr. 28, 2005    (JP) ................................. 2005-132937

(51) Int. Cl.
G02F 1/133    (2006.01)
G02F 1/1335    (2006.01)
(52) U.S. Cl. .......................................... 349/116; 349/65
(58) Field of Classification Search ................... 349/116
See application file for complete search history.

(56) References Cited

U.S. PATENT DOCUMENTS

| | | | | |
|---|---|---|---|---|
| 4,760,389 A * | 7/1988 | Aoki et al. | ..................... | 345/102 |
| 6,087,648 A * | 7/2000 | Zhang et al. | ................ | 250/208.1 |
| 6,867,826 B2 * | 3/2005 | Miyashita | ........................ | 349/61 |
| 2002/0011978 A1 | 1/2002 | Yamazaki et al. | | |
| 2003/0001800 A1 | 1/2003 | Nakajima et al. | | |
| 2004/0207775 A1 * | 10/2004 | Min et al. | ........................ | 349/65 |

FOREIGN PATENT DOCUMENTS

| | | |
|---|---|---|
| JP | 03-249622 | 11/1991 |
| JP | 04-174819 | 6/1992 |
| JP | 05-241512 | 9/1993 |
| JP | 2000-124484 | 4/2000 |
| JP | 2002-062856 | 2/2002 |
| JP | 2002-175026 | 6/2002 |
| JP | 2002-277872 | 9/2002 |

OTHER PUBLICATIONS

English translation of JP 4-174819, published Jun. 23, 1992.
International Search Report mailed Jul. 18, 2006.

* cited by examiner

*Primary Examiner* — W. Patty Chen
*Assistant Examiner* — Wen-Ying P. Chen
(74) *Attorney, Agent, or Firm* — Nixon & Vanderhye P.C.

(57) ABSTRACT

In a liquid crystal display including a liquid crystal display panel formed by sandwiching a liquid crystal layer between an active matrix substrate 2 and a counter substrate, and a backlight system 10 that illuminates the liquid crystal display panel from the active matrix substrate side, an optical sensor 5 for detecting the intensity of ambient light is provided in a peripheral region of a display region 6 in a substrate surface of the active matrix substrate 2 on the liquid crystal layer side. The optical sensor 5 is located near the outer edge 6d of the display region 6 that is perpendicular to the direction (X direction) in which the directivity of emitted light of the backlight system 10 is highest.

20 Claims, 8 Drawing Sheets

LIQUID CRYSTAL DISPLAY DEVICE COMPRISING AN OPTICAL SENSOR FOR DETECTING THE INTENSITY OF AMBIENT LIGHT

This application is the U.S. national phase of International Application No. PCT/JP2006/308155 filed 18 Apr. 2006 which designated the U.S. and claims priority to JP 2005-132937 filed 28 Apr. 2005, the entire contents of each of which are hereby incorporated by reference.

TECHNICAL FIELD

The present invention relates to a liquid crystal display provided with an optical sensor.

BACKGROUND ART

In recent years, a liquid crystal display including a so-called environmental sensor (in the following, referred to as an "ambient sensor") for detecting the intensity of light in the surroundings (in the following, referred to as "ambient light") has been known (for example, see Patent documents 1 and 2). In such a liquid crystal display, the intensity of light radiated from a backlight system is adjusted according to the intensity of the detected ambient light.

More specifically, in the case of a transparent liquid crystal display, the light intensity of the backlight system is raised in a light environment such as the outdoors and reduced in a relatively dark environment such as the nighttime and indoors. Thus, a liquid crystal display provided with the ambient sensor achieves improved screen visibility lower power consumption and longer lifetime. The liquid crystal display provided with the ambient sensor is useful particularly as a display device of portable terminals (mobile phones, PDAs, hand-held game machine, etch) that are often taken outdoors for use.

Examples of the ambient sensor include optical sensors such as a photodiode and a phototransistor. The optical sensor can be mounted on the liquid crystal display by placing an optical sensor provided as a discrete component on a display panel (for example, see Patent document 3). Also, in recent years, in order to cut the manufacturing cost and miniaturize the display device by reducing the number of components, an attempt has been made to form an optical sensor monolithically on an active matrix substrate constituting a display panel (for example, see Patent document 4). In this case, the optical sensor is formed by utilizing the process of forming an active element (TFT).

Figure 14:
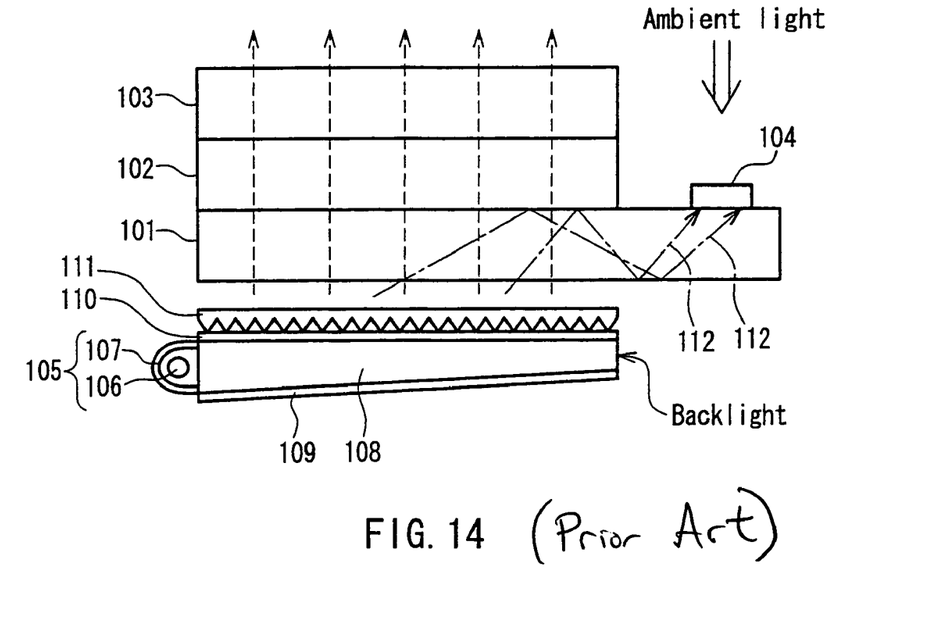
FIG. 14 shows the configuration of a conventional liquid crystal display on which an optical sensor is mounted.

Herein, the configuration of a liquid crystal display on which an optical sensor is mounted will be described with reference to FIG. 14. FIG. 14 shows the configuration of a conventional liquid crystal display on which an optical sensor is mounted. In FIG. 14, the configuration of a liquid crystal display panel constituting the liquid crystal display is illustrated schematically.

As shown in FIG. 14, the liquid crystal display panel is constituted by sandwiching a liquid crystal layer 102 between an active matrix substrate 101 and a counter substrate 103. A region of the active matrix substrate 101 that is in contact with the liquid crystal layer 102 serves as a display region. In the display region, a plurality of pixels are arranged in a matrix. Each of the pixels includes an active element and a pixel electrode. Further, an optical sensor 104 is formed monolithically in a region surrounding the display region (in the following, referred to as a "peripheral region") by utilizing the process of forming the active elements.

A backlight system is disposed on the back side (the side on which no active element is formed) of the active matrix substrate 101. In the example of FIG. 14, the backlight system is of a sidelight type and mainly includes a light guide plate 108 and a light source 105. The light source 105 is constituted by a fluorescent lamp 106 and a lamp reflector 107. Further, a reflective sheet 109 is attached to the lower surface and sides (not shown) of the light guide plate 108. Moreover, a diffusing sheet 110 and a prism sheet 111 are attached to the upper surface (an emission surface) of the light guide plate 108 in this order Light emitted from the light source 105 is reflected inside the light guide plate 108 and emitted from the upper surface (the emission surface) of the light guide plate 108. The light emitted from the emission surface of the light guide plate 108 first enters the diffusing sheet 110 and is diffused. This reduces brightness unevenness. Further, the light that has passed through the diffusing sheet 110 is refracted by a prism sheet 111 so as to be turned into light that is substantially parallel with the normal to the emission surface, and passes through the active matrix substrate 101, the liquid crystal layer 102 and the counter substrate 103 in this order.

Also, at this time, a control device (not shown in FIG. 14) of the backlight system adjusts the intensity of light emitted from the light source 105 in the backlight system according to the intensity of ambient light detected by the optical sensor 104. Therefore, using the liquid crystal display as shown in FIG. 14, it is possible to improve the screen visibility and achieve lower power consumption and longer lifetime.

Patent document 1: JP 4(1992)-174819 A
Patent document 2: JP 5(1993)-241512 A
Patent document 3: JP 2002-62856 A (FIGS. 12 to 14)
Patent document 4: JP 2002-175026 A (FIG. 12)

DISCLOSURE OF INVENTION

Problem to be Solved by the Invention

However, in the conventional liquid crystal display, light that has been emitted from the emission surface of the light guide plate 108 and passed through the prism sheet 111 is not perfectly parallel. Thus, as shown in FIG. 14, part of the light emitted from the light guide plate 108 does not enter the liquid crystal layer 102 but is repeatedly subjected to interface reflection by both principal surfaces of the active matrix substrate 101, and then becomes stray light 112.

Further, in the case where the optical sensor 104 is formed monolithically on the active matrix substrate, the stray light 112 sometimes enters the optical sensor 104 as in the example of FIG. 14. In that case, the stray light 112 becomes noise to the optical sensor 104, thus lowering the ambient light detection accuracy of the optical sensor 104. As a result, in the liquid crystal display, it becomes difficult to adjust the screen brightness appropriately.

It is an object of the present invention to solve the problem described above and to provide a liquid crystal display capable of suppressing a decrease in the detection accuracy when detecting ambient light.

Means for Solving Problem

In order to achieve the above object, a first liquid crystal display of the present invention includes a liquid crystal display panel formed by sandwiching a liquid crystal layer between an active matrix substrate and a counter substrate, and a backlight system that illuminates the liquid crystal display panel from the active matrix substrate side. The active matrix substrate includes a display region in a substrate surface on the liquid crystal layer side, and an optical sensor for detecting the intensity of ambient light in a peripheral region surrounding the display region. The display region is in the form of a rectangle including a first side and a second side that cross at right angles. The backlight system emits light whose directivity is higher in a direction parallel to the first side than in a direction parallel to the second side. The optical sensor is located at a position closer to the second side than to the first side in the peripheral region.

In order to achieve the above object, a second liquid crystal display of the present invention includes a liquid crystal display panel formed by sandwiching a liquid crystal layer between an active matrix substrate and a counter substrate, and a backlight system that illuminates the liquid crystal display panel from the active matrix substrate side. The active matrix substrate includes an optical sensor for detecting the intensity of ambient light in a region surrounding a display region provided in a substrate surface on the liquid crystal layer side. The optical sensor is located near the outer edge of the display region that is perpendicular to a direction in which the directivity of emitted light of the backlight system is higher.

EFFECTS OF THE INVENTION

Concerning interface reflection in the active matrix substrate, based on the optical principles, the larger the incident angle and the reflection angle of light with respect to the normal to the active matrix substrate are, the more the components of the light undergo interface reflection, resulting in an increase in stray light. In other words, for the components of light with small angles of incidence and reflection, the interface reflection is reduced, and the number of interface reflections before the light reaches the optical sensor is increased. In most cases, therefore, these light components do not become stray light.

For this reason, in the present invention, the optical sensor is located so that the interface reflectance of stray light is minimized, and also stray light traveling toward the optical sensor is attenuated while maximizing the number of reflections required for the stray light to enter the optical sensor. Accordingly, the liquid crystal display of the present invention can prevent stray light from entering the optical sensor of the active matrix substrate, and thus can suppress a decrease in the detection accuracy.

BRIEF DESCRIPTION OF DRAWINGS

FIG. 5 shows stray light that is repeatedly reflected in an active matrix substrate.

DESCRIPTION OF THE INVENTION

The first liquid crystal display of the present invention includes a liquid crystal display panel formed by sandwiching a liquid crystal layer between an active matrix substrate and a counter substrate, and a backlight system that illuminates the liquid crystal display panel from the active matrix substrate side. The active matrix substrate includes a display region in a substrate surface on the liquid crystal layer side, and an optical sensor for detecting the intensity of ambient light in a peripheral region surrounding the display region. The display region is in the form of a rectangle including a first side and a second side that cross at right angles. The backlight system emits light whose directivity is higher in a direction parallel to the first side than in a direction parallel to the second side. The optical sensor is located at a position closer to the second side than to the first side in the peripheral region.

In the first liquid crystal display it is preferable that characteristic curves of light emitted from the backlight system are obtained by observing the display region from the normal direction and plotted on a diagram in which the vertical axis indicates brightness and the horizontal axis indicates an emission angle of the emitted light, and that the characteristic curve in the direction parallel to the first side has a sharper peak characteristic than the characteristic curve in the direction parallel to the second side.

In the first liquid crystal display, the backlight system may include a light guide plate and a light source located at one side of the light guide plate. In this case, the light source of the backlight system may include a plurality of light-emitting diodes arranged along the one side of the light guide plate, and the backlight system may be located so that the one side at which the light-emitting diodes are arranged is perpendicular to the direction parallel to the first side. This configuration can further suppress stray light incident on the optical sensor.

A second liquid crystal display of the present invention includes a liquid crystal display panel formed by sandwiching a liquid crystal layer between an active matrix substrate and a counter substrate, and a backlight system that illuminates the liquid crystal display panel from the active matrix substrate side. The active matrix substrate includes an optical sensor for detecting the intensity of ambient light in a region surrounding a display region provided in a substrate surface on the liquid crystal layer side. The optical sensor is located near the outer edge of the display region that is perpendicular to a direction in which the directivity of emitted light of the backlight system is higher.

In the second liquid crystal display, it is preferable that characteristic curves of the emitted light of the backlight system are obtained by observing the display region from the normal direction and plotted on a diagram in which the vertical axis indicates brightness and the horizontal axis indicates an emission angle of the emitted light, and that the characteristic curve in the direction in which the directivity is higher has a sharpest peak characteristic.

In the second liquid crystal display, the display region may be in the form of a rectangle, and the backlight system may include a light guide plate and a light source located at one side of the light guide plate. In this case, the light source of the backlight system may include a plurality of light-emitting diodes arranged along the one side of the light guide plate, and the backlight system may be located so that the one side at which the light-emitting diodes are arranged is perpendicular to the direction in which the directivity of the emitted light of the backlight system is higher. This configuration can further suppress stray light incident on the optical sensor.

The first and second liquid crystal displays further may include a condenser lens that converges the emitted light of the backlight system for each of pixels formed in the active matrix substrate or for each group of the pixels aligned. The condenser lens may be arranged between the active matrix substrate and the backlight system so as not to overlap with the optical sensor in the thickness direction of the active matrix substrate. This configuration can improve the utilization efficiency of the emitted light of the backlight system while suppressing stray light incident on the optical sensor In the first and second liquid crystal displays, it is preferable that a plurality of active elements are formed in the active matrix substrate, and that at least part of the constituent members of the optical sensor is formed in the active matrix substrate by the same process as the constituent members of the active elements. This configuration makes it possible to cut the manufacturing cost and miniaturize the display device by reducing the number of components.

In the first and second liquid crystal displays, the optical sensor may be located so as not to overlap with the counter substrate in the thickness direction of the active matrix substrate. In contrast, the optical sensor also may be located so as to overlap with the counter substrate in the thickness direction of the active matrix substrate, and may receive the ambient light that has passed through the counter substrate.

In the former case, the optical sensor can be located in a wide portion of the peripheral region, so that the degree of freedom in wiring can be ensured. In the latter case, although the degree of freedom in wiring is reduced, the ambient light can be prevented from entering the peripheral circuit of the optical sensor. Thus, it is possible to suppress the degradation of elements or wiring constituting the peripheral circuit. Moreover, in the latter case, when the counter substrate or the active matrix substrate includes a black matrix layer, the black matrix layer may have an opening through which the ambient light enters the optical sensor.

In the first and second liquid crystal displays, when the backlight system includes a light guide plate and a plurality of light-emitting diodes arranged along one side of the light guide plate (and further when the display region is in the form of a rectangle for the second liquid crystal display), it is preferable that the light-emitting diodes are arranged closer to the side opposite to the side of the display region at which the optical sensor is located. This configuration can increase the distance between the optical sensor and the light source, and thus can further suppress stray light incident on the optical sensor.

Embodiment 1

Hereinafter, a liquid crystal display of Embodiment 1 of the present invention will be described with reference to the drawings. In the liquid crystal display of Embodiment 1, an optical sensor for detecting ambient light is positioned in accordance with the emission characteristics of light emitted from a backlight system (in the following, referred to as "emitted light"), thereby suppressing a decrease in the detection accuracy due to stray light. The following description refers to FIGS. 1 to 7.

Figure 1:
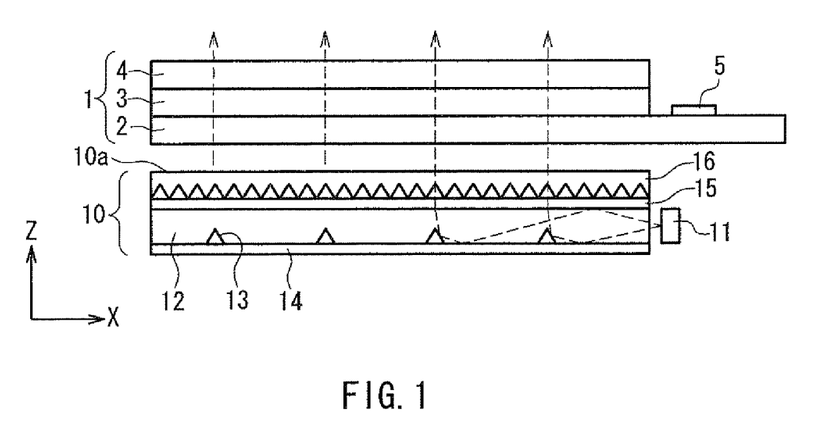
FIG. 1 is a cross-sectional view showing the schematic configuration of a liquid crystal display of Embodiment 1 of the present invention.
Figure 2:
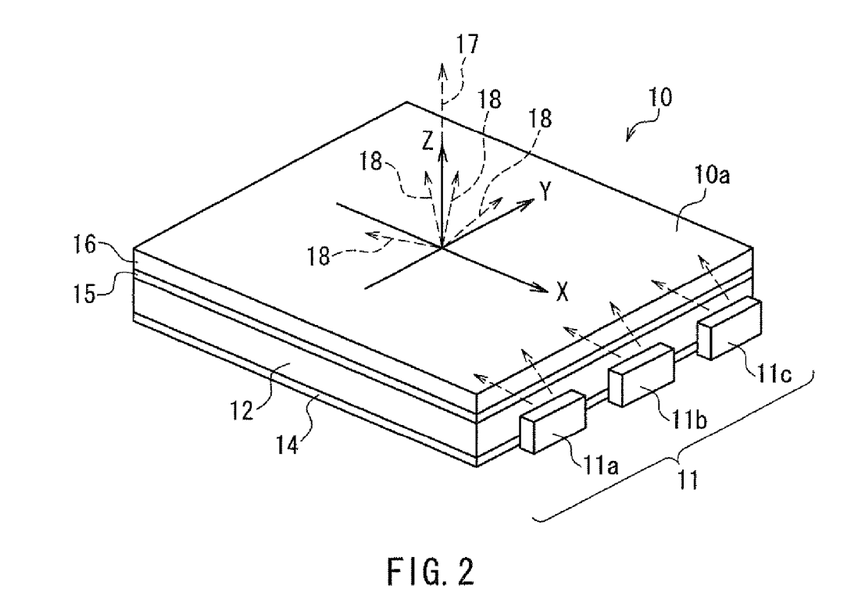
FIG. 2 is a perspective view showing the schematic configuration of a backlight system illustrated in FIG. 1.

The schematic configuration of the liquid crystal display of Embodiment 1 is described based on FIGS. 1 and 2. FIG. 1 is a cross-sectional view showing the schematic configuration of the liquid crystal display of Embodiment 1. FIG. 2 is a perspective view showing the schematic configuration of a backlight system illustrated in FIG. 1. As shown in FIG. 1, the liquid crystal display of Embodiment 1 includes a liquid crystal display panel 1 formed by sandwiching a liquid crystal layer 3 between an active matrix substrate 2 and a counter substrate 4, and a backlight system 10. Although not shown in FIG. 1, the counter substrate 4 is provided with a color filter, a common electrode, a black matrix layer, and the like.

A region of the active matrix substrate 2 that is in contact with the liquid crystal layer 3 serves as a display region. Although not shown in FIG. 1, a plurality of pixels, each of which includes an active element and a pixel electrode, are formed in a matrix in the display region. The display region is rectangular in shape. The active matrix substrate 2 includes an optical sensor 5 for detecting the intensity of ambient light in a region (in the following, referred to as a "peripheral region") surrounding the display region provided in the substrate surface on the liquid crystal layer side.

Figure 7:
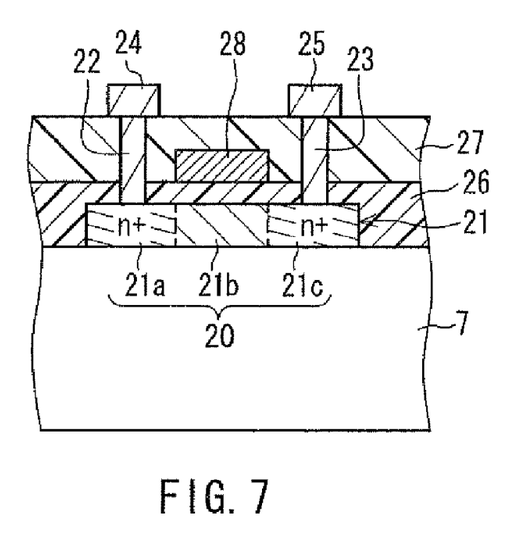
FIG. 7 is a cross-sectional view showing the configuration of an active element formed in the active matrix substrate illustrated in FIG. 1.

In Embodiment 1, the optical sensor 5 is formed monolithically on a base substrate (glass substrate) of the active matrix substrate 2 by using the process of forming the active elements, as shown in FIG. 7. In this case, "formed monolithically on the glass substrate" means that elements are formed directly on the glass substrate by a physical process and/or a chemical process and excludes the case in which a semiconductor circuit is placed on the glass substrate.

Although not shown in FIG. 1, the active matrix substrate 1 also includes a horizontal driving circuit and a vertical driving circuit in the peripheral region. An external substrate (not shown in FIG. 1) is connected to the active matrix substrate 1 via an FPC. Moreover, IC chips (not shown in FIG. 1) are mounted on the external substrate. The IC chips may include a reference supply circuit for generating a power supply voltage to be used in the liquid crystal display, a control circuit for controlling the horizontal driving circuit and the vertical driving circuit, or the like.

As shown in FIGS. 1 and 2, the backlight system 10 is a sidelight-type backlight system including a light source 11 and a light guide plate 12, and illuminates the liquid crystal display panel 1 from the active matrix substrate side. In Embodiment 1, unlike the example illustrated in FIG. 14 in the background art section, the light source 11 includes a plurality of light-emitting diodes 11a to 11c. This configuration reduces both weight and thickness of the backlight system 10, compared to the use of a fluorescent lamp (see FIG. 14) as a light source.

The light-emitting diodes 11a to 11c are arranged in a row along one side of the light guide plate 12. A plurality of prisms 13 are provided on the bottom of the light guide plate 12 so as to direct the light that has entered the light guide plate 12 from the light source 11 to the entire light guide plate 12. These prisms 13 are grooves with a triangular cross section.

In Embodiment 1, a reflective sheet 14 is attached to the lower surface and sides (not shown) of the light guide plate 12 similarly to the example (in the following, referred to as a "conventional example") illustrated in FIG. 14 in the background art section. Moreover, like the conventional example, a diffusing sheet 15 and a prism sheet 16 are attached to the upper surface of the light guide plate 12 in this order.

In Embodiment 1, like the conventional example, the emitted light of the backlight system 10 is not perfectly parallel. As shown in FIG. 2, the emitted light of the backlight system 10 includes a light ray 17 traveling parallel to the normal to the emission surface 10a of the backlight system 10 and a light ray 18 traveling in a direction inclined with respect to the normal. Therefore, stray light may occur inside the active matrix substrate 2 in Embodiment 1.

Moreover, the degree of divergence (directivity) of the emitted light of the backlight system 10 varies depending on the direction. For example, when a direction that is parallel to the normal to the emission surface 10a is identified as a Z direction, and two directions that are perpendicular to the Z direction and cross at right angles are identified as an X direction and a Y direction, the degree of divergence (directivity) in the X direction differs from that in the Y direction. In Embodiment 1, the X direction and the Y direction are parallel to any side of the display region.

Figure 3:
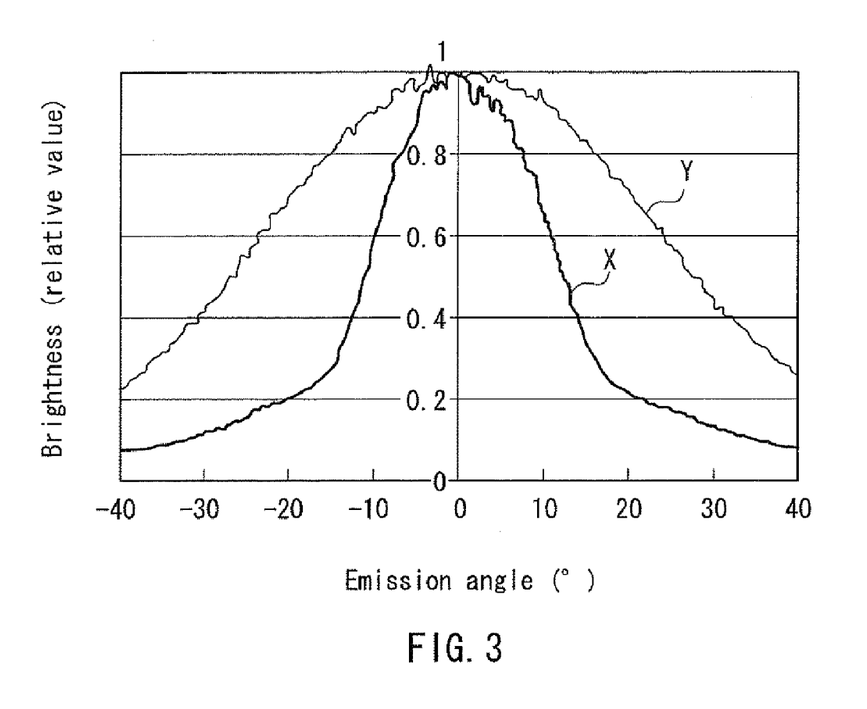
FIG. 3 is a characteristic diagram of emitted light of the backlight system illustrated in FIG. 2.
Figure 4:
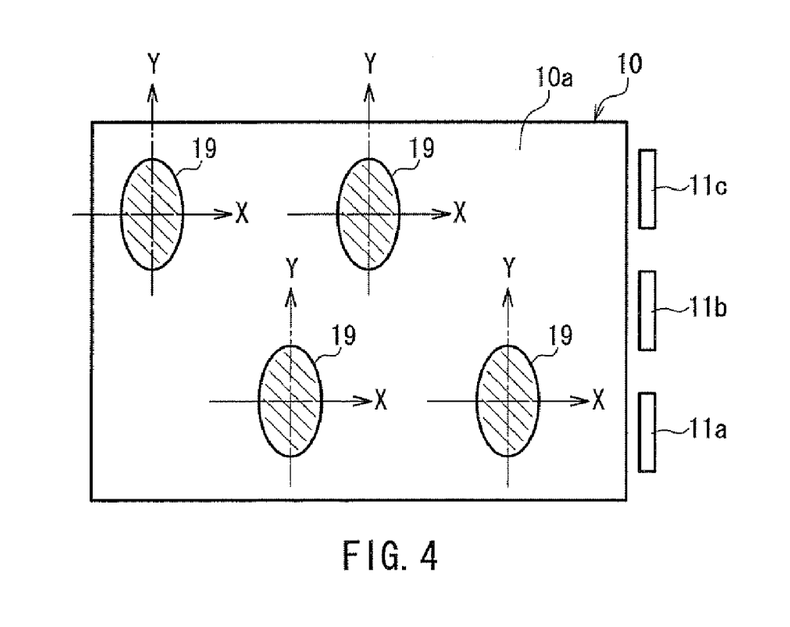
FIG. 4 is a conceptual diagram showing the emission characteristics of emitted light of the backlight system illustrated in FIG. 2.
Figure 5A:
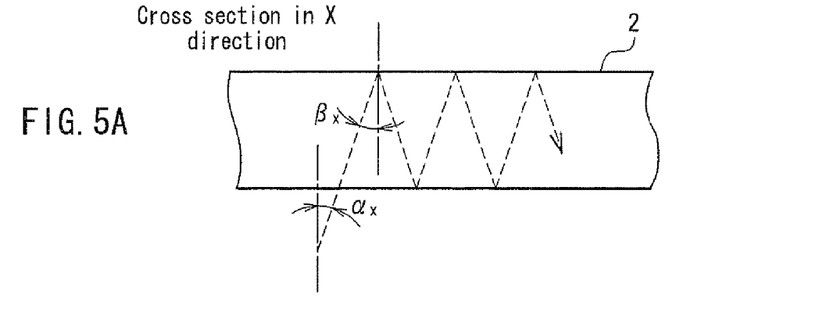
FIG. 5A is a cross-sectional view taken along the X direction.
Figure 5B:
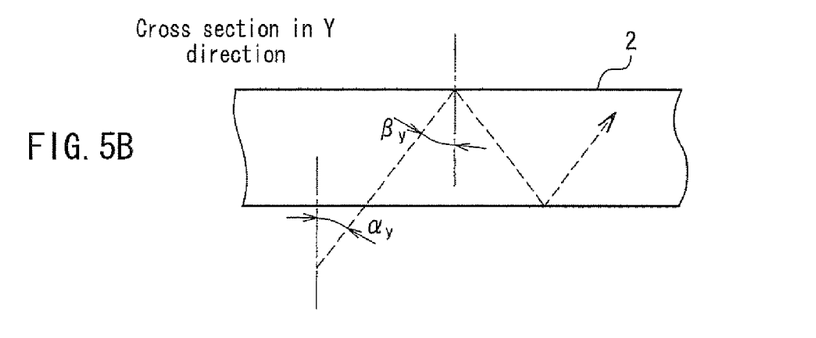
FIG. 5B is a cross-sectional view taken along the Y direction.

The emission characteristics of the emitted light of the backlight system 10 illustrated in FIGS. 1 and 2 are described with reference to FIGS. 3 and 4. FIG. 3 is a characteristic diagram of the emitted light of the backlight system in FIG. 2. FIG. 4 is a conceptual diagram showing the emission characteristics of the emitted light of the backlight system in FIG. 2. FIG. 5 shows stray light that is repeatedly reflected in the active matrix substrate: FIG. 5A is a cross-sectional view taken along the X direction; and FIG. 5B is a cross-sectional view taken along the Y direction.

The characteristic diagram of FIG. 3 is obtained by observing the display region (display screen) of the liquid crystal display panel in the normal direction. Specifically, the characteristic diagram of FIG. 3 is determined from the brightness distribution of the display region (display screen) measured with a luminance meter. In FIG. 3, the vertical axis indicates the brightness, and the horizontal axis indicates the emission angle of the emitted light. The emission angle is an angle of the emitted light with respect to the normal (Z axis, see FIG. 2) to the emission surface 10a.

In FIG. 3, "X" represents a characteristic curve in the X direction and indicates the relationship between the brightness and the emission angle of light rays present in a X-Z plane. Similarly, "Y" represents a characteristic curve in the Y direction and indicates the relationship between the brightness and the emission angle of light rays present in a Y-Z plane.

As shown in FIG. 3, the peak characteristic of the characteristic curve in the X direction is sharper than that of the characteristic curve in the Y direction. Thus, the degree of divergence of the emitted light of the backlight system 10 becomes larger in the Y direction than in the X direction. The directivity of the emitted light of the backlight system 10 is higher in the X direction than in the Y direction.

Accordingly, the directivity is high in the direction perpendicular to the side at which the light-emitting diodes 11a to 11c are arranged. This is because based on the optical principles of the backlight system in which light from the light-emitting diodes enters the side of the light guide plate and then is emitted toward the upper surface of the light guide plate via optical members such as prisms, the degree of divergence (directivity) of the light from the light-emitting diodes directly affects the degree of divergence (directivity) of the emitted light in the Y direction. On the other hand, in the X direction, the angular components of light that can be emitted via the optical members are limited by each of the optical members. Therefore, only the light components with a smaller degree of divergence (higher directivity) are generally emitted in the X direction, compared to those in the Y direction.

The light to be emitted from the light guide plate 12 includes light components that do not meet the interface reflection conditions in the light guide plate 12, and the emission angle is very large in general. Therefore, the light is made substantially perpendicular to the light guide plate 12 by the optical members such as the prism sheet 16 disposed on the upper surface of the light guide plate 12. The prisms 13 of the light guide plate 12 also play a role in changing the interface reflection conditions. Thus, as shown in FIG. 1, when viewed from the X-Z plane, the emitted light is emitted at a relatively narrow angle and has a relatively small degree of divergence (high directivity). In contrast, as shown in FIG. 2, when viewed from the Y-Z plane, the emitted light is emitted at a relatively wide angle and has low directivity.

The grooves forming the prisms 13 have sloping surfaces that extend in the Y direction. Therefore, the prisms 13 are effective to change the direction of light in the X-Z plane, but hardly serve to change the direction of light in the Y-Z plane. Thus, the emitted light that is bent in the Z direction by the prisms 13 has a relatively large degree of divergence (low directivity) in the Y-Z plane (Y direction).

In this embodiment, the light guide plate 12 provided with the prisms 13 has been described as an example of the principle of making a difference in the degree of divergence (directivity) between the X and Y directions. However, the configuration of the light guide plate 12 is not limited thereto. Any type of light guide plate that allows light to enter from the side can cause a difference in the degree of divergence (directivity) between the X and Y directions based on substantially the same principle. In Embodiment 1, the backlight system is not particularly limited as long as the directivity in the X direction differs from that in the Y direction.

The emission characteristics of the emitted light in the emission surface 10a of the backlight system 10 are conceptually shown in FIG. 4. In FIG. 4, reference numeral 19 denotes a brightness distribution at any portion of the emission surface 10a of the backlight system 10. As shown in FIG. 4, the light emitted from the emission surface 10a of the backlight system 10 diverges in the form of an ellipse. The minor axis of the ellipse corresponds to the X axis, and the major axis corresponds to the Y axis.

Thus, if a light ray inclined with respect to the normal in the X-Z plane (in the following, referred to as "X light ray") and a light ray inclined with respect to the normal in the Y-Z plane (in the following, referred to as "Y light ray") are emitted from the same portion of the emission surface 10a with the same intensity, and both the light rays become stray light, they repeat interface reflections between two principal surfaces of the active matrix substrate 2, as shown in FIG. 5. Specifically, in the cross section along the X direction (X-Z plane), as shown in FIG. 5A, the light that has not entered the liquid crystal layer 3 (see FIG. 1) enters the active matrix substrate 2 at an incident angle $\alpha_X$, and then is repeatedly reflected at a reflection angle $\beta_X$. On the other hand, in the cross section along the Y direction (Y-Z plane), as shown in FIG. 5B, the light that has not entered the liquid crystal layer 3 (see FIG. 1) enters the active matrix substrate 2 at an incident angle $\alpha_Y (>\alpha_X)$, and then is repeatedly reflected at a reflection angle $\beta_Y (>\beta_X)$.

In this case, the incident angle $\alpha_X$ in the X direction is smaller than the incident angle $\alpha_Y$ in the Y direction, and the reflection angle $\beta_X$ in the X direction also is smaller than the reflection angle $\beta_Y$ in the Y direction. Therefore, the number of reflections required for the X light ray to reach the outer edge of the display region is larger than that of reflections required for the Y light ray to reach the outer edge of the display region. Thus, the X light ray has been more attenuated than the Y light ray at the time they reach the outer edge of the display region. Since the interface reflectance of the Y light ray is higher than that of the X light ray due to the difference in the incident angle, the amount of stray light traveling in the X direction while repeating reflections is smaller than that of stray light traveling in the Y direction while repeating reflections.

Figure 6:
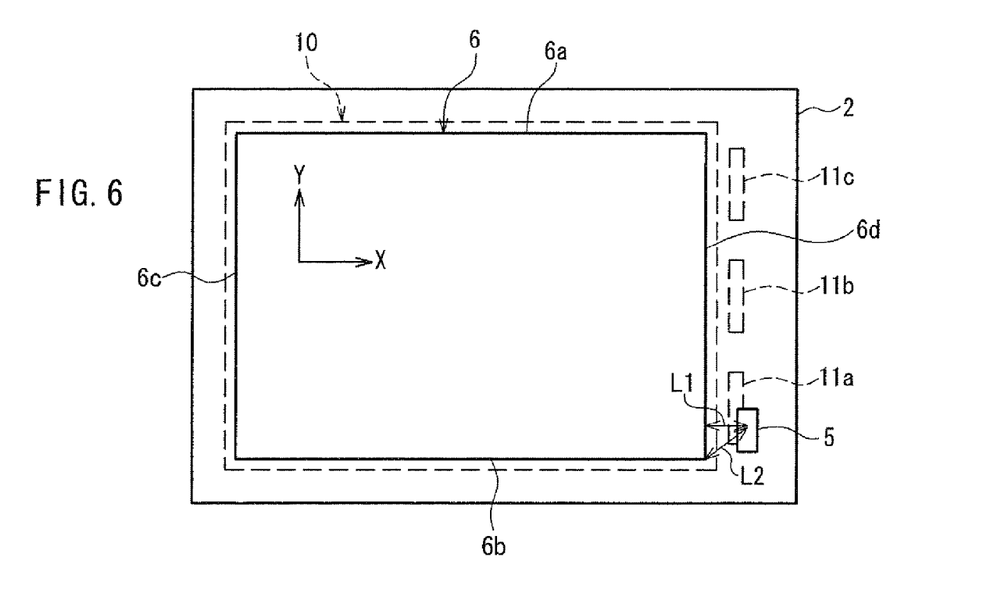
FIG. 6 is a plan view showing the positional relationship between an optical sensor and a light source of the backlight system in the liquid crystal display illustrated in FIG. 1.

Referring to FIG. 6, the position at which the optical sensor is located will be described. FIG. 6 is a plan view showing the positional relationship between the optical sensor and the light source of the backlight system in the liquid crystal display illustrated in FIG. 1. In Embodiment 1, as described with reference to FIGS. 3 to 5, the stray light of the X light ray is attenuated when it reaches the outer edge (side) of the display region, and the intensity has been reduced. Therefore, to suppress a decrease in the detection accuracy of ambient light, the optical sensor 5 may be located near the side 6c or 6d of the display region 6 that is perpendicular to the X direction, as shown in FIG. 6. In other words, the optical sensor 5 should be located at the position closer to the side 6c or 6d parallel to the Y direction than to the side 6a or 6b parallel to the X direction.

In Embodiment 1, there is a large margin for the peripheral region of the active matrix substrate 2 at the side 6d rather than the side 6c of the display region 6. Therefore, the optical sensor 5 is located in the vicinity of the side 6d of the display region 6 so as to suppress an increase in the external size of the active matrix substrate. In this case, the optical sensor 5 is located at the position where a distance L1 from the center of the optical sensor 5 to the short side (6d) is shorter than a distance L2 from the center of the optical sensor 5 to the long side (6b).

As described above, in Embodiment 1, the optical sensor 5 is located near the outer edge of the display region 6 that is perpendicular to the direction in which the directivity of the emitted light of the backlight system 10 is higher, thereby preventing stray light from entering the optical sensor 5. Thus, Embodiment 1 can suppress a decrease in the detection accuracy when detecting ambient light.

Like the liquid crystal display illustrated in FIG. 14 in the background art section, the optical sensor is formed monolithically on the active matrix substrate of the liquid crystal display in Embodiment 1. This configuration will be described with reference to FIGS. 7 and 8.

FIG. 7 is a cross-sectional view showing the configuration of an active element formed in the active matrix substrate illustrated in FIG. 1. As shown in FIG. 7, an active element 20 includes a silicon film 21 formed on a glass substrate 7 and a gate electrode 28 disposed in an upper layer of the silicon film 21. The glass substrate 7 is a base substrate of the active matrix substrate 2 (see FIG. 1). In FIG. 7, hatching is omitted for the glass substrate 7.

The silicon film 21 is formed by forming a silicon film on the glass substrate 7, followed by photolithography and etching. Examples of the silicon film to be formed include an amorphous silicon film, a polysilicon film, a low-temperature polysilicon film, and a CG (continuous-grain) silicon film.

In the example of FIG. 7, the active element 20 is an n-type TFT. Therefore, n-type semiconductor regions 21a and 21c serving as a source and a drain of the TFT are formed in the silicon film 21. The n-type semiconductor regions 21a, 21c are formed by the ion implantation of n-type impurities such as arsenic. Reference numeral 21b denotes a channel region serving as a channel of the TFT.

A first interlayer insulating film 26 is interposed between the gate electrode 28 and the silicon film 21. A portion of the first interlayer insulating film 27 located immediately below the gate electrode 28 functions as a gate insulating film. A second interlayer insulating film 27 is formed on the first interlayer insulating film 26 so as to cover the gate electrode 28.

In the example of FIG. 7, the first interlayer insulating film 27 is formed by forming a silicon nitride film or a silicon oxide film with a CVD method after the formation of the silicon film 21. The gate electrode 28 is formed by forming a conductive film such as a silicon film on the first interlayer insulating film 26 with the CVD method or the like, followed by photolithography and etching. The second interlayer insulating film 27 is formed in the same manner as the first interlayer insulating film 26 after the formation of the gate electrode 28.

Moreover, contact plugs 22 and 23 are formed so as to penetrate through the first interlayer insulating film 26 and the second interlayer insulating film 27. The contact plugs 22, 23 are formed by forming contact holes penetrating through the first and second interlayer insulating films 26, 27 and fling the contact holes with a conductive material. Electrode patterns 24 and 25 also are formed on the second interlayer insulating film 27 and connected to the contact plugs 22 and 23. The electrode patterns 24, 25 are formed by forming a conductive film on the second interlayer insulating film 27 and patterning the conductive film by photolithography and etching.

Figure 8:
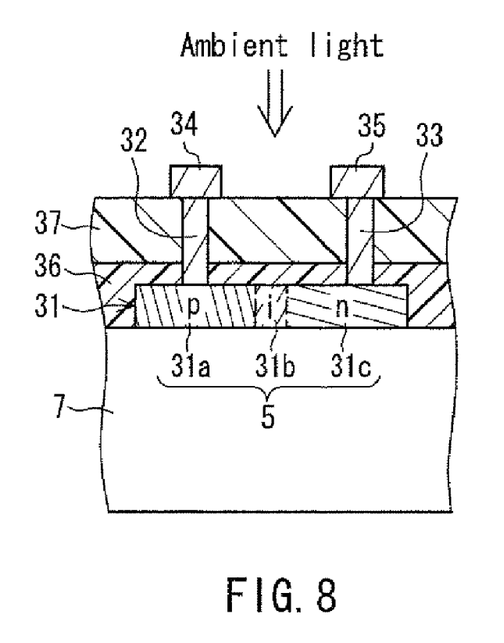
FIG. 8 is a cross-sectional view showing the specific configuration of the optical sensor illustrated in FIG. 1.

FIG. 8 is a cross-sectional view showing the specific configuration of the optical sensor illustrated in FIG. 1. As shown in FIG. 8, in Embodiment 1, the optical sensor 5 is a PIN-type photodiode. The optical sensor 5 includes a silicon film 31 formed on the glass substrate 7. The silicon film 31 is provided with a p-type semiconductor region (p layer) 31a, an intrinsic semiconductor region (i layer) 31b, and an n-type semiconductor region (n layer) 31c.

A first interlayer insulating film 36 and a second interlayer insulating film 37 are formed in this order on the upper surface of the optical sensor 5. Moreover, the p layer 31a of the optical sensor 5 is connected to an electrode pattern 34 via a contact plug 32, and the n layer 31b of the optical sensor 5 is connected to an electrode pattern 35 via a contact plug 33.

Further, the constituent members of the optical sensor 5 are formed by the same process as those of the active element 20 in FIG. 7. Specifically, the silicon film 31 of the optical sensor 5 is the same as the silicon film 21 of the active element 20 in FIG. 7. The silicon film 31 of the optical sensor 5 is formed simultaneously with the silicon film 21 by the process of forming the silicon film 21 of the active element 20 in FIG. 7.

Then layer 31c and the p layer 31a of the silicon film 31 are formed by the process (ion implantation process) of forming the p-type or n-type semiconductor region of the active element 20 (see FIG. 7), the horizontal driving circuit (not shown), and the vertical driving circuit (not shown). For example, the n layer 31c of the silicon film 31 can be formed by the process (ion implantation process) of forming the semiconductor regions 21a, 21c of the active element 20 in FIG. 7. When the semiconductor regions 21a, 21c of the active element 20 are formed by plural times of ion implantation under different implantation conditions, the ion implantation that is most suitable for forming the n layer 31c is selected among them.

It is appropriate that the i layer 31b of the silicon film 31 is more electrically neutral than the n layer 31c and the p layer 31a. Specifically, the i layer 31b is formed so that the impurity concentration of the i layer 31b is smaller than those of the n layer 31c and the p layer 31a. For example, the i layer 31b can be formed by providing a mask in a region where the i layer 31b is to be formed during ion implantation or, if the formed silicon film is not electrically neutral, by performing ion implantation in the region where the i layer 31b is to be formed. When the ion implantation is performed, among the ion implantation processes of forming the active element 20 (FIG. 7), the horizontal driving circuit (not shown), and the vertical driving circuit (not shown), the ion implantation whose conditions are most suitable can be selected and utilized.

Moreover, the first interlayer insulating film 36 covering the optical sensor 5 is the same as the first interlayer insulating film 26 of the active element 20 in FIG. 7, and is formed by the process of forming the first interlayer insulating film 26 of the active element 20. Similarly, the second interlayer insulating film 37 also is the same as the second interlayer insulating film 27 of the active element in FIG. 7, and is formed by the process of forming the second interlayer insulating film 27 of the active element 20.

Embodiment 2

Figure 9:
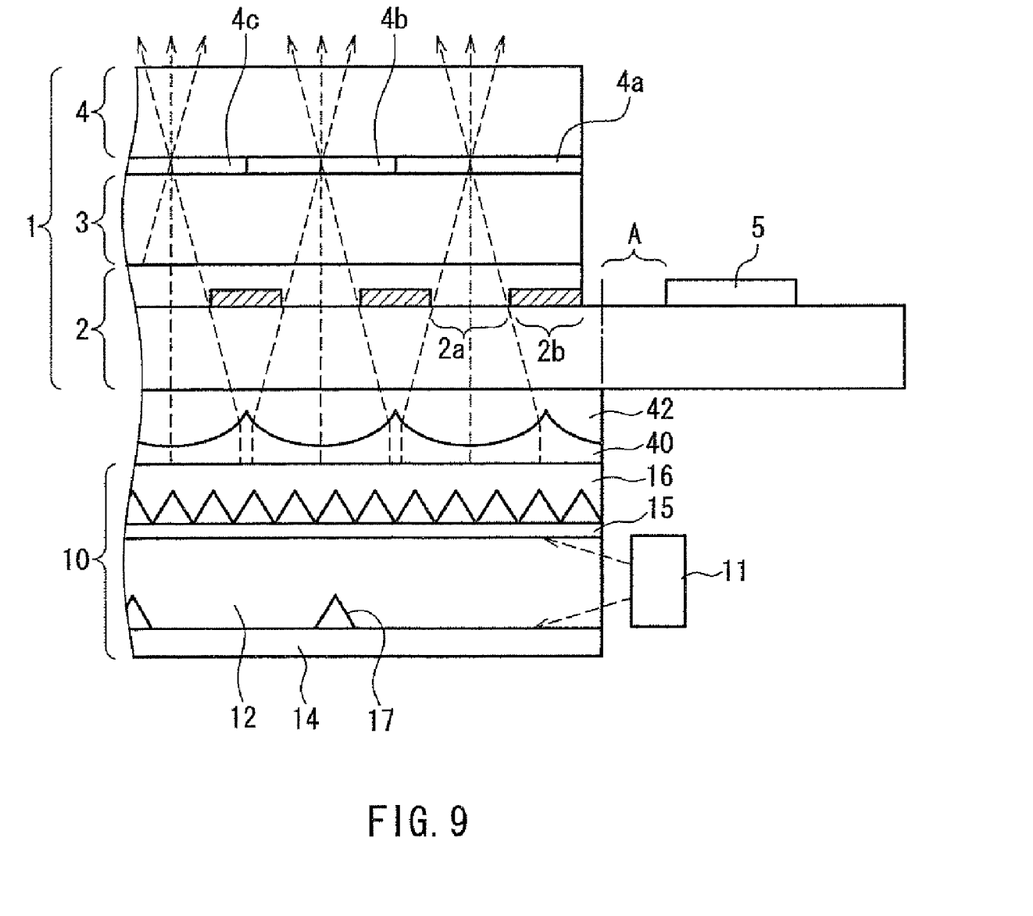
FIG. 9 is a partially enlarged cross-sectional view showing the configuration of a liquid crystal display of Embodiment 2 of the present invention.
Figure 10:
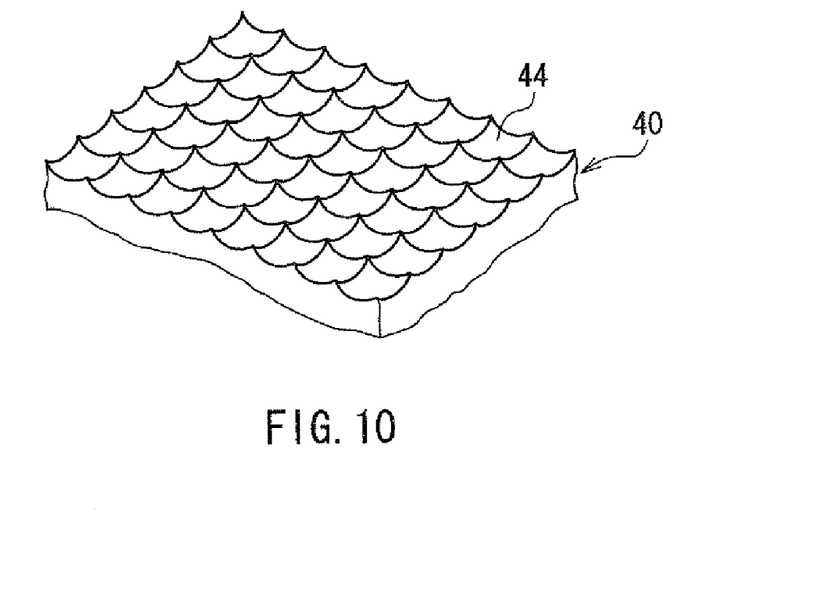
FIG. 10 is a perspective view showing a portion of a condenser lens illustrated in FIG. 9.
Figure 11:
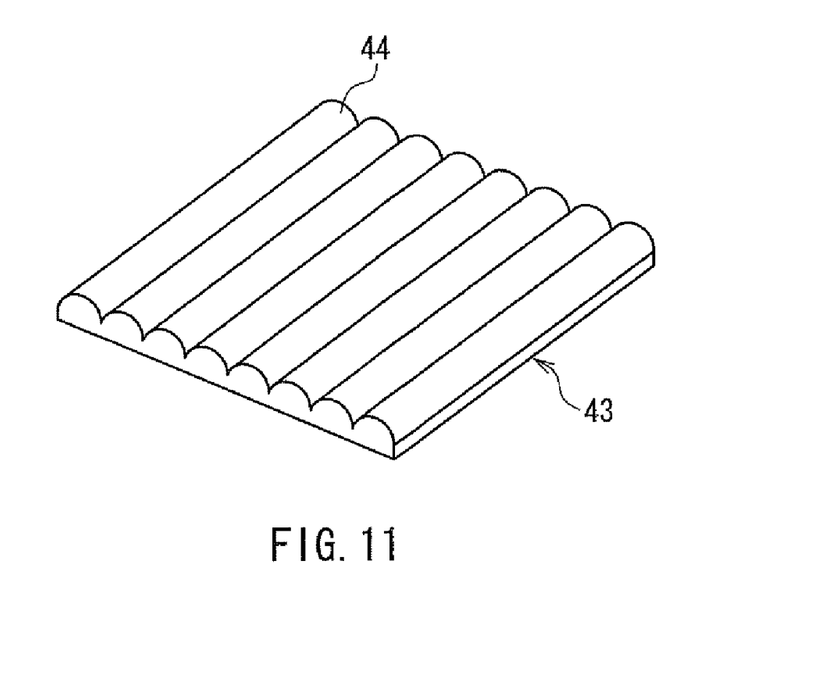
FIG. 11 is a perspective view showing another example of a condenser lens.

Next, a liquid crystal display of Embodiment 2 of the present invention will be described with reference to FIGS. 9 to 11. FIG. 9 is a partially enlarged cross-sectional view showing the configuration of the liquid crystal display of Embodiment 2. FIG. 10 is a perspective view showing a portion of a condenser lens illustrated in FIG. 9. FIG. 11 is a perspective view showing another example of a condenser lens.

As shown in FIG. 9, unlike the liquid crystal display of Embodiment 1, the liquid crystal display of Embodiment 2 includes a condenser lens 40 and a transparent resin layer 42 between a backlight system 10 and a liquid crystal display panel 1. The other structures of the liquid crystal display of Embodiment 2 are the same as those of the liquid crystal display of Embodiment 1. In Embodiment 2, an optical sensor 5 is located near the outer edge of a display region that is perpendicular to the direction in which the directivity of emitted light of the backlight system 10 is higher.

An active matrix substrate 2 is configured by forming a silicon film, a pixel electrode, an insulating film, metal wiring, etc. on a base substrate (glass substrate). In this case, the metal wiring or the like acts as a light-shielding film against the emitted light of the backlight system 10. Therefore, as shown in FIG. 9, the active matrix substrate 2 has apertures 2a at positions corresponding to the individual pixels, so that light-shielding portions 2b are provided around the pixels. With this configuration, light that is emitted from the backlight system 10 and strikes the light-shielding portions 2b cannot pass through a liquid crystal layer 3 and a counter substrate 4. Thus, in the liquid crystal display, it is required to improve the utilization efficiency of the emitted light.

In Embodiment 2, the condenser lens 40 is arranged between the liquid crystal display panel 1 and the backlight system 10, and converges the emitted light of the backlight system 10 onto the apertures 2a, thereby improving the utilization efficiency of the emitted light. Specifically, as shown in FIG. 10, the condenser lens 40 includes lens elements (concave) 41 corresponding to the individual pixels, and the lens elements 41 converge the emitted light for each pixel. The light rays converged by each of the lens elements 41 enter the apertures 2a and pass through the liquid crystal layer 3 and the counter substrate 4. The resin layer 42 is used to fix the condenser lens 40 to the active matrix substrate 1. Reference numerals 4a to 4c denote color filters.

Due to the presence of the condenser lens 40, a light ray that has passed through the center of each lens travels in a straight line, while a light ray that has passed through the periphery of the lens is refracted at the interface between the lenses and then travels. Accordingly the light rays that have passed through each of the lens elements 41 are converged in accordance with the lens shapes. However, when the condenser lens 40 is provided, the emitted light of the backlight system 10 diverges after passing through the focal point of the lens elements 41. Consequently the viewing angle of the liquid crystal display becomes wider.

In such a case, it is necessary to enhance the directivity of the backlight system so that the viewing angle of the liquid crystal display (FIG. 9) including the condenser lens 40 should be substantially the same as the viewing angle of the liquid crystal display (FIG. 1) that does not include a condenser lens. In other words, if the liquid crystal display in FIG. 9 has substantially the same viewing angle as that of the liquid crystal display in FIG. 1, a backlight system with higher directivity than the backlight system of Embodiment 1 (FIG. 1) can be used as the backlight system 10 of Embodiment 2 (FIG. 9).

In general, a backlight system with higher directivity can be designed to improve the front brightness. Therefore, a backlight system having high front brightness and high directivity can be used in Embodiment 2. Moreover, the light entering the periphery of each lens of the condenser lens 40, namely the light that would be blocked by the light-shielding portions 2b and not contribute to display if the condenser lens 40 was not provided, is refracted and transmitted through the apertures 2a. Thus, because of the use of the condenser lens 40, the liquid crystal display of Embodiment 2 can make the display screen brighter than the liquid crystal display of Embodiment 1.

In Embodiment 2, the condenser lens 40 is formed so as not to overlap with the optical sensor 5 in the thickness direction of the active matrix substrate 2, as shown in FIG. 9. This configuration can prevent the light that has been refracted by the condenser lens 40 from entering the optical sensor 5 as stray light As shown in FIG. 9, it is preferable that a region A where the condenser lens 40 does not overlap with the optical sensor 5 in the thickness direction of the active matrix substrate 2 is provided between the display region and the optical sensor 6. In this case, the emitted light of the backlight system passing through the region A is not affected by the condenser tens and has high directivity. Therefore, the effect of stray light on the optical sensor 5 can be reduced further. Moreover, it is also preferable that a distance between a projection region obtained by projecting the region where the condenser lens 40 is formed onto the substrate surface of the active matrix substrate 2 and the optical sensor 5 is not less than the lens diameter of the lens element 44.

According to Embodiment 2, it is possible not only to suppress a decrease in the detection accuracy due to stray light, but also to improve the utilization efficiency of the emitted light of the backlight system. Although Embodiment 2 uses the condenser lens 40 in which a plurality of lens elements 41 are arranged in an array, as shown in FIG. 10, the present invention is not limited thereto.

In Embodiment 2, e.g., a condenser lens 43 as shown in FIG. 11 also can be used. The condenser lens 43 is a lenticular lens including a plurality of ribbed convex lenses 44. The condenser lens 43 converges the emitted light of the backlight system 10 for each group of pixels aligned. Moreover, it is preferable that the condenser lens 43 is arranged so that the direction in which the convex lenses 44 extend is parallel to the Y direction (see FIG. 6). This is because, in the sidelight-type backlight system 10 using the light-emitting diodes as the light source 11 in FIG. 9, the directivity of the emitted light can be enhanced more easily in the X direction than in the Y direction, as described above.

Embodiment 3

Figure 12:
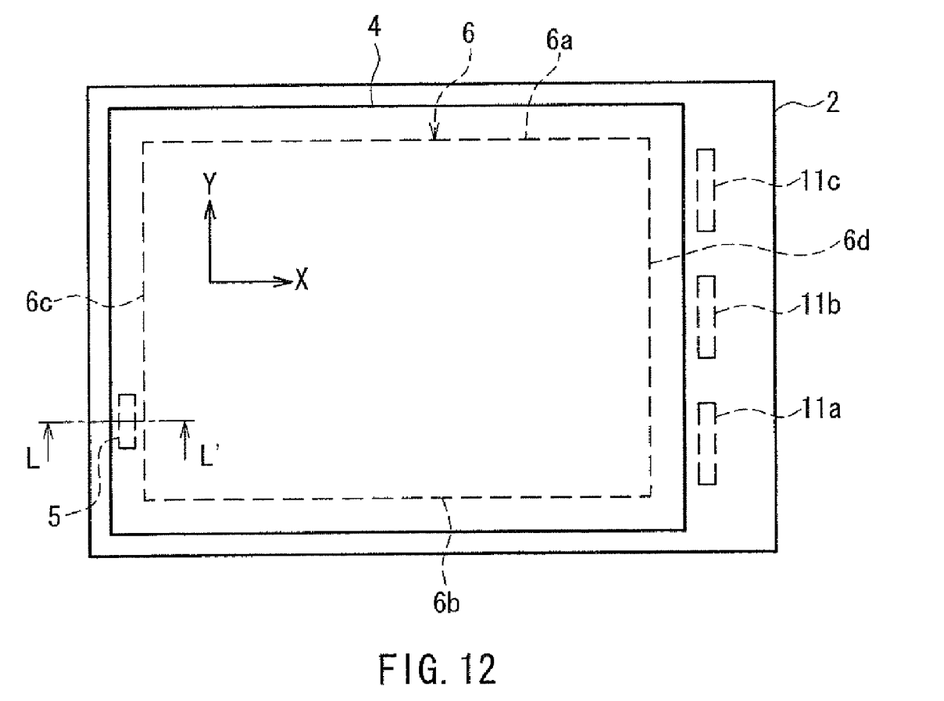
FIG. 12 is a plan view showing the schematic configuration of a liquid crystal display of Embodiment 3 of the present invention.
Figure 13:
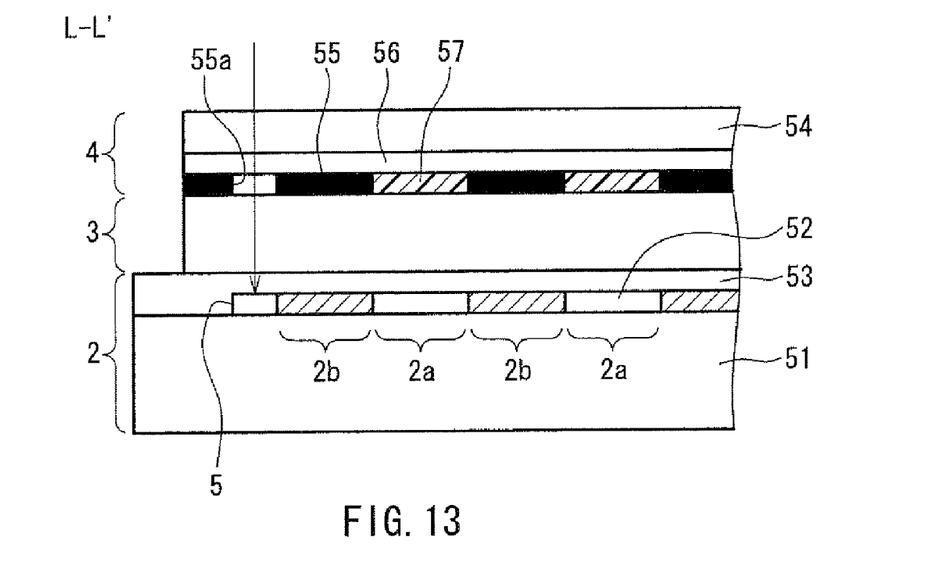
FIG. 13 is a partially enlarged cross-sectional view of the liquid crystal display illustrated in FIG. 12, taken along the line L-L' in FIG. 12.

Next, a liquid crystal display of Embodiment 3 of the present invention will be described with reference to FIGS. 12 and 13. FIG. 12 is a plan view showing the schematic configuration of the liquid crystal display of Embodiment 3. FIG. 13 is a partially enlarged cross-sectional view of the liquid crystal display illustrated in FIG. 12, taken along the line L-L' in FIG. 12.

In FIGS. 12 and 13, the same reference numerals as those in FIGS. 1, 2, 4, 5, 6 and 9 denote the same members. In FIG. 12, a backlight system is indicated simply by light-emitting diodes 11a to 11c that are used as a light source of the backlight system. In FIG. 13, the backlight system is omitted.

As shown in FIGS. 12 and 13, like the liquid crystal display of Embodiment 1, the liquid crystal display of Embodiment 3 also includes a liquid crystal display panel 1 and a backlight system. The liquid crystal display panel 1 is formed by sandwiching a liquid crystal layer 3 between an active matrix substrate 2 and a counter substrate 4. In FIG. 13, reference numeral 52 denotes a pixel electrode, 53 denotes a protective film, 56 denotes a common electrode, and 57 denotes a color filter.

In Embodiment 3, as shown in FIG. 12, an optical sensor 5 is provided in a peripheral region of a display region 6 of the active matrix substrate 2. The optical sensor 5 is located near the outer edge of the display region 6 that is perpendicular to the direction (X direction) in which the directivity of emitted light of the backlight system is higher.

In Embodiment 3, unlike Embodiment 1, the optical sensor 5 is located near a side 6c of the display region 6, as shown in FIG. 12. The side 6c is opposite a side 6d at which the light-emitting diodes 11a to 11c are arranged. The optical sensor 5 of Embodiment 3 is located farther from the light-emitting diodes 11a to 11c, compared to the optical sensor 5 of Embodiment 1.

In other words, the optical sensor 5 of Embodiment 3 is located at the position where the attenuation of light emitted from the light-emitting diodes 11a to 11c is large, and stray light is not likely to occur. Thus, Embodiment 3 can further prevent the stray light from entering the optical sensor.

In Embodiment 3, the optical sensor 5 is located near the side 6c, and therefore is present in a region of the active matrix substrate 2 that overlaps with the counter substrate 4. Moreover, as shown in FIG. 13, a black matrix layer 55 formed in the counter substrate 4 has an opening 55a through which ambient light reaches the optical sensor 5.

This configuration allows only the ambient light that has passed through the counter substrate 4 to enter the optical sensor 5, but makes it difficult for ambient light to enter the portions other than the light-receiving portion of the optical sensor 5 such as a peripheral circuit of the optical sensor 5. Accordingly, compared to Embodiment 1, Embodiment 3 can suppress the degradation of elements or wiring constituting the peripheral circuit of the optical sensor 5 due to ambient light.

In Embodiments 1 to 3, the sidelight-type backlight system has been described. However, the present invention is not limited thereto and may use a direct-type backlight system. The light source of the backlight system is not particularly limited, and can be, e.g., a fluorescent lamp.

In the present invention, the optical sensor is not limited to a photodiode, and an optical sensor other than the photodiode such as a phototransistor also can be used. Moreover, the optical sensor does not have to be formed monolithically in the active matrix substrate. The present invention can be applied without causing any problems as long as it is a liquid crystal display provided with an optical sensor that light propagating inside the active matrix substrate enters.

INDUSTRIAL APPLICABILITY

The liquid crystal display according to the present invention is useful as a liquid crystal display that is provided with an optical sensor and adjusts screen brightness according to the intensity of ambient light, and thus has an industrial applicability.

The invention claimed is:
1. A liquid crystal display comprising:
a liquid crystal display panel formed by sandwiching a liquid crystal layer between an active matrix substrate and a counter substrate; and
a backlight system that illuminates the liquid crystal display panel from the active matrix substrate side,
wherein the active matrix substrate comprises a display region in a substrate surface on the liquid crystal layer side, and an optical sensor for detecting an intensity of ambient light in a peripheral region surrounding the display region,
the display region is in the form of a rectangle including a first side and a second side that cross at right angles,
the backlight system emits light whose directivity is higher in a direction parallel to the first side than in a direction parallel to the second side,
the optical sensor is located at a position closer to the second side than to the first side in the peripheral region, and
wherein the display includes only one optical sensor for detecting intensity of ambient light.
2. The liquid crystal display according to claim 1, wherein characteristic curves of light emitted from the backlight system are obtained by observing the display region from a normal direction and plotted on a diagram in which a vertical axis indicates brightness and a horizontal axis indicates an emission angle of the emitted light, and
the characteristic curve in the direction parallel to the first side has a sharper peak characteristic than the characteristic curve in the direction parallel to the second side.
3. The liquid crystal display according to claim 1, wherein the backlight system comprises a light guide plate and a light source located at one side of the light guide plate.
4. The liquid crystal display according to claim 3, wherein the light source of the backlight system comprises a plurality of light-emitting diodes arranged along the one side of the light guide plate, and
the backlight system is located so that the one side at which the light-emitting diodes are arranged is perpendicular to the direction parallel to the first side.

5. A liquid crystal display comprising:
a liquid crystal display panel including a liquid crystal layer between at least an active matrix substrate and a counter substrate,
a backlight system that illuminates the liquid crystal display panel from the active matrix substrate side,
wherein the active matrix substrate comprises a display region, and an optical sensor for detecting an intensity of ambient light in a peripheral region at least partially surrounding the display region,
the display region is in the form of a rectangle including a first side and a second side that cross at right angles,
the backlight system emits light whose directivity is higher in a direction parallel to the first side than in a direction parallel to the second side,
the optical sensor is located at a position closer to the second side than to the first side in the peripheral region,
a condenser lens that converges emitted light of the backlight system for each of pixels formed in the active matrix substrate or for each group of the pixels aligned, and
wherein the condenser lens is arranged between the active matrix substrate and the backlight system so as not to overlap with the optical sensor in a thickness direction of the active matrix substrate.

6. The liquid crystal display according to claim 1, wherein a plurality of active elements are formed in the active matrix substrate, and
at least part of constituent members of the optical sensor is formed in the active matrix substrate by a same process as constituent members of the active elements.

7. The liquid crystal display according to claim 1, wherein the optical sensor is located so as not to overlap with the counter substrate in a thickness direction of the active matrix substrate.

8. A liquid crystal display comprising:
a liquid crystal display panel including a liquid crystal layer between at least an active matrix substrate and a counter substrate,
a backlight system that illuminates the liquid crystal display panel from the active matrix substrate side,
wherein the active matrix substrate comprises a display region, and an optical sensor for detecting an intensity of ambient light in a peripheral region at least partially surrounding the display region,
the display region is in the form of a rectangle including a first side and a second side that cross at right angles,
the backlight system emits light whose directivity is higher in a direction parallel to the first side than in a direction parallel to the second side,
the optical sensor is located at a position closer to the second side than to the first side in the peripheral region, and
wherein the optical sensor is located so as to overlap with the counter substrate in a thickness direction of the active matrix substrate, and receives the ambient light that has passed through the counter substrate.

9. The liquid crystal display according to claim 8, wherein the counter substrate or the active matrix substrate comprises a black matrix layer, and
the black matrix layer has an opening through which the ambient light enters the optical sensor.

10. The liquid crystal display according to claim 1, wherein the backlight system comprises a light guide plate and a plurality of light-emitting diodes arranged along one side of the light guide plate, and
the light-emitting diodes are arranged closer to a side opposite to the second side at which the optical sensor is located.

11. A liquid crystal display comprising:
a liquid crystal display panel including a liquid crystal layer between an active matrix substrate and a counter substrate; and
a backlight system that illuminates the liquid crystal display panel from the active matrix substrate side,
wherein the active matrix substrate comprises an optical sensor for detecting an intensity of ambient light in a region surrounding a display region provided in a substrate surface on the liquid crystal layer side,
the optical sensor is located near an outer edge of the display region that is perpendicular to a direction in which directivity of emitted light of the backlight system is higher, and
wherein no optical sensor for detecting intensity of ambient light is located closer to an outer edge of the display region that is substantially parallel to the direction in which directivity of emitted light of the backlight system is higher.

12. The liquid crystal display according to claim 11, wherein characteristic curves of the emitted light of the backlight system are obtained by observing the display region from a normal direction and plotted on a diagram in which a vertical axis indicates brightness and a horizontal axis indicates an emission angle of the emitted light, and
the characteristic curve in the direction in which the directivity is higher has a sharpest peak characteristic.

13. The liquid crystal display according to claim 11, wherein the display region is in the form of a rectangle, and
the backlight system comprises a light guide plate and a light source located at one side of the light guide plate.

14. The liquid crystal display according to claim 13, wherein the light source of the backlight system comprises a plurality of light-emitting diodes arranged along the one side of the light guide plate, and
the backlight system is located so that the one side at which the light-emitting diodes are arranged is perpendicular to the direction in which the directivity of the emitted light of the backlight system is higher.

15. A liquid crystal display comprising:
a liquid crystal display panel including a liquid crystal layer between at least an active matrix substrate and a counter substrate; and
a backlight system that illuminates the liquid crystal display panel from the active matrix substrate side,
wherein the active matrix substrate comprises an optical sensor for detecting an intensity of ambient light in a region at least partially surrounding a display region provided in a substrate surface on the liquid crystal layer side,
the optical sensor is located near an outer edge of the display region that is perpendicular to a direction in which directivity of emitted light of the backlight system is higher,
a condenser lens that converges the emitted light of the backlight system for each of pixels formed in the active matrix substrate or for each group of the pixels aligned, and
wherein the condenser lens is arranged between the active matrix substrate and the backlight system so as not to overlap with the optical sensor in a thickness direction of the active matrix substrate.

16. The liquid crystal display according to claim 11, wherein a plurality of active elements are formed in the active matrix substrate, and at least part of constituent members of the optical sensor is formed in the active matrix substrate by a same process as constituent members of the active elements.

17. The liquid crystal display according to claim 11, wherein the optical sensor is located so as not to overlap with the counter substrate in a thickness direction of the active matrix substrate.

18. A liquid crystal display comprising:

a liquid crystal display panel including a liquid crystal layer between at least an active matrix substrate and a counter substrate; and a backlight system that illuminates the liquid crystal display panel from the active matrix substrate side, wherein the active matrix substrate comprises an optical sensor for detecting an intensity of ambient light in a region at least partially surrounding a display region provided in a substrate surface on the liquid crystal layer side, the optical sensor is located near an outer edge of the display region that is perpendicular to a direction in which directivity of emitted light of the backlight system is higher, wherein the optical sensor is located so as to overlap with the counter substrate in a thickness direction of the active matrix substrate, and receives the ambient light that has passed through the counter substrate.

19. The liquid crystal display according to claim 18, wherein the counter substrate or the active matrix substrate comprises a black matrix layer, and the black matrix layer has an opening through which the ambient light enters the optical sensor.

20. The liquid crystal display according to claim 11, wherein the display region is in the form of a rectangle, the backlight system comprises a light guide plate and a plurality of light-emitting diodes arranged along one side of the light guide plate, and the light-emitting diodes are arranged closer to a side opposite to the side of the display region at which the optical sensor is located.

* * * * *